(12) United States Patent
Driesen et al.

(10) Patent No.: US 9,582,562 B2
(45) Date of Patent: Feb. 28, 2017

(54) USING TEMPORARY SYSTEM TO PROVIDE CONTINUOUS ACCESS DURING APPLICATION UPGRADE

(71) Applicants: Volker Driesen, Heidelberg (DE);
Nicolai Jordt, Bad Langbrüchen (DE);
Martin Mayer, Heidelberg (DE);
Wieland Hoprich, Mannheim (DE);
Andrey Engelko, Karlsruhe (DE);
Steffen Meissner, Heidelberg (DE);
Peter Schreiber, Wiesloch (DE); Levke Bentzien, Heidelberg (DE)

(72) Inventors: Volker Driesen, Heidelberg (DE);
Nicolai Jordt, Bad Langbrüchen (DE);
Martin Mayer, Heidelberg (DE);
Wieland Hoprich, Mannheim (DE);
Andrey Engelko, Karlsruhe (DE);
Steffen Meissner, Heidelberg (DE);
Peter Schreiber, Wiesloch (DE); Levke Bentzien, Heidelberg (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 13/730,746

(22) Filed: Dec. 28, 2012

(65) Prior Publication Data
US 2013/0238868 A1 Sep. 12, 2013

Related U.S. Application Data

(60) Provisional application No. 61/607,545, filed on Mar. 6, 2012.

(51) Int. Cl.
*G06F 12/00* (2006.01)
*G06F 17/30* (2006.01)
*G06F 12/16* (2006.01)

(52) U.S. Cl.
CPC ........ *G06F 17/30578* (2013.01); *G06F 12/16* (2013.01); *G06F 17/303* (2013.01); *G06F 17/30091* (2013.01)

(58) Field of Classification Search
CPC .... G06F 8/71; G06F 11/368; G06F 17/30353; G06F 21/57; G06F 11/1433
See application file for complete search history.

(56) References Cited

U.S. PATENT DOCUMENTS

7,523,142 B2 * 4/2009 Driesen et al.
2005/0251523 A1 * 11/2005 Rajamani et al. ............ 707/100
(Continued)

*Primary Examiner* — David X Yi
*Assistant Examiner* — Francisco Grullon
(74) *Attorney, Agent, or Firm* — Mintz Levin Cohn Ferris Glovsky and Popeo, P.C.

(57) ABSTRACT

A temporary system is described to provide, during an upgrade of an application implemented using an original system, a continuous access to the application. A copy of a first data-set characterizing a first version of the application is generated on the temporary system when the upgrade becomes available. A selective access to the copy on the temporary system is enabled while preventing access to the first data-set on an original system. The first data-set on the original system is upgraded to form a second data-set characterizing a second version of the application, and a testing of the second data-set is performed. When a result of the testing indicates that the second data-set should be implemented, an access to the second data-set on the original system is enabled while preventing access to the copy on the temporary system. Related methods, apparatus, systems, techniques and articles are also described.

19 Claims, 8 Drawing Sheets

(56) References Cited

U.S. PATENT DOCUMENTS

2008/0098046 A1* 4/2008 Alpern et al. ................ 707/203
2009/0019094 A1* 1/2009 Lashley et al. ............... 707/203
2010/0088281 A1* 4/2010 Driesen et al. ............... 707/641
2010/0162226 A1* 6/2010 Borissov et al. ............. 717/173
2011/0246419 A1* 10/2011 Yancey et al. ................ 707/624

* cited by examiner

USING TEMPORARY SYSTEM TO PROVIDE CONTINUOUS ACCESS DURING APPLICATION UPGRADE

RELATED APPLICATION

This application claims priority under 35 U.S.C. §119 to U.S. Provisional Application Ser. No. 61/607,545, filed Mar. 6, 2012, entitled "TRUE ZERO DOWNTIME," the disclosures of which are hereby fully incorporated by reference.

TECHNICAL FIELD

The subject matter described herein relates to using a temporary system to provide a continuous access to an application and associated data to a user during an upgrade of the application.

BACKGROUND

Some business entities (for example, companies that make enterprise software to manage business operations and customer relations) provide application software (i.e., each known as an "application") to their customers. When an application needs to be upgraded to a new version, the application and associated data may be inaccessible for a significant downtime (for example, a few hours) during the upgrade. Moreover, all the users using the application may be synchronously logged out for the upgrade to occur. Such inaccessibility during the long downtime and the synchronous unplanned logout of the customers can be inconvenient to the customers, and may result in a loss of revenue and/or loss in profits for the business entities.

SUMMARY

In some implementations, methods and apparatus, including computer program products, and related systems are provided for a temporary system that provides continuous access to an application and associated data to at least one user during a modification (for example, an upgrade) of the application.

In some implementations, this method may include generating, using one or more processors, a copy of a first data-set on a temporary system. In some implementations, the first data-set may characterize a first version of an application. In some implementations, this method may also include enabling, using one or more processors, access to the copy to a user of the application during a time period; and upgrading, using one or more processors, the first data-set to form a second data-set that characterizes a second version of the application. In some implementations, the upgrading may occur during a first portion of the time-period. In some implementations, this method may also include testing, using one or more processors, the second data-set during a second portion of the time-period; and enabling, using one or more processors, access to the second data-set to the user of the application when a result of the testing indicates that the second data-set should be implemented.

The above methods, apparatus, and computer program products may, in some implementations, further include one or more of the following features.

In some implementations, the first data-set and the second data-set may be executed on an original system, and the copy may be executed on the temporary system.

In some implementations, the access to the copy during the time period may be read-only access for a portion of the first data-set that is changed during the upgrading. In other implementations, the access to the copy during the time period may be read and write access for another portion of the first data-set that is unchanged during the upgrading.

In still other implementation, the method may further include preventing an access to the first data-set during the time-period using one or more processors.

In yet other implementations, the method may further include preventing, using one or more processors, access to the copy when a result of the testing indicates that the second data-set should be implemented. In some implementations, access to the second data-set may be enabled after a completion of the time-period, and access to the copy may be prevented after the completion of the time-period.

In some implementations, the method may further include rolling-back, using one or more processors, changes performed by the upgrading to form the first data-set. In some implementations, the rolling back may be performed when a result of the testing indicates that the second data-set should not be implemented. In some implementations, the method may also include enabling, using one or more processors, access to the first data-set formed by the rolling-back of the changes for the user of the application. In some implementations, the method may also include preventing, using one or more processors, access to the copy when access is enabled for the user of the application to the first data-set formed by the rolling-back of the changes.

In still other implementations, the application may be executed in a computing landscape that includes an enterprise resource planning system, a customer relationship management system, and a business warehouse system. With regard to this computing landscape, the first data-set may include data associated with a first version of the computing landscape, and the second data-set may include data associated with a second version of the computing landscape. In still other implementations, the temporary system may allow a communication between the enterprise resource planning system, the customer relationship management system, and the business warehouse system via one or more communication channels. In some implementations, the one or more communication channels may be the same communication channels used for communication allowed by an original system.

In some implementations, there is provided a non-transitory computer-readable medium. The non-transitory computer-readable medium may contain instructions to configure a processor to perform operations. These operations may include generating a copy of a first data-set characterizing a first version of an application, the copy being generated on a temporary system; enabling a selective access to a user of the application to the copy during a time-period; upgrading the first data-set to form a second data-set characterizing a second version of the application, the upgrading occurring during a first portion of the time-period; performing a testing of the second data-set during a second portion of the time-period; rolling-back changes performed by the upgrading to form the first data-set, the rolling-back being performed when a result of the testing indicates the second data-set should not be implemented; and enabling, for the user of the application, access to the first data-set formed by the rolling-back of the changes.

In some implementations, the operations may also include preventing access to the copy when a result of the testing indicates that the second data-set should not be implemented. In some implementations, the enabling of the access to the first data-set may be obtained after the rolling-back occurs after a completion of the time-period. In still other implementations, the preventing of the access to the copy may occur after the completion of the time-period.

In some implementations, the operations may also include enabling, when a result of the testing indicates that the second data-set should be implemented and for the user of the application, an access to the second data-set. In some implementations, access to the copy may be prevented when access to the second data-set is enabled.

In some implementations, there is provided a system that includes at least one programmable processor and a machine-readable medium. The machine-readable medium may store instructions that, when executed by the at least one processor, cause the at least one programmable processor to perform operations. These operations may include generating a copy of a first data-set characterizing a first version of an application, the copy being generated on a temporary system; enabling a selective access to the copy during a time-period; upgrading the first data-set to form a second data-set characterizing a second version of the application, the upgrading being performed during a first portion of the time-period; performing a testing of the second data-set during a second portion of the time-period; enabling an access to the second data-set when a result of the testing indicates that the second data-set should be implemented; and rolling-back changes performed by the upgrading to form the first data-set, the rolling-back being performed when a result of the testing indicates the second data-set includes one or more critical errors; and enabling access to the first data-set formed by the rolling-back of the changes.

In some implementations, the operations may also include preventing access to the copy when a result of the testing is obtained.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the application continuously remains accessible to the users of the application during an upgrade of the application, thereby eliminating or minimizing the downtime. Such a continuous accessibility during the downtime is cost-efficient and time-efficient for the customers. Moreover, the users are allowed to log-out asynchronously (that is, individually and independent of the log-out time of other users) for the upgrade to occur on their computing device. Accordingly, any inconvenience caused to the users due to a forcible log-out can be prevented, thereby resulting in loyalty amongst users. Such a user-satisfaction can result in an increased profit and increased revenue for those users and the application provider.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Figure 1:
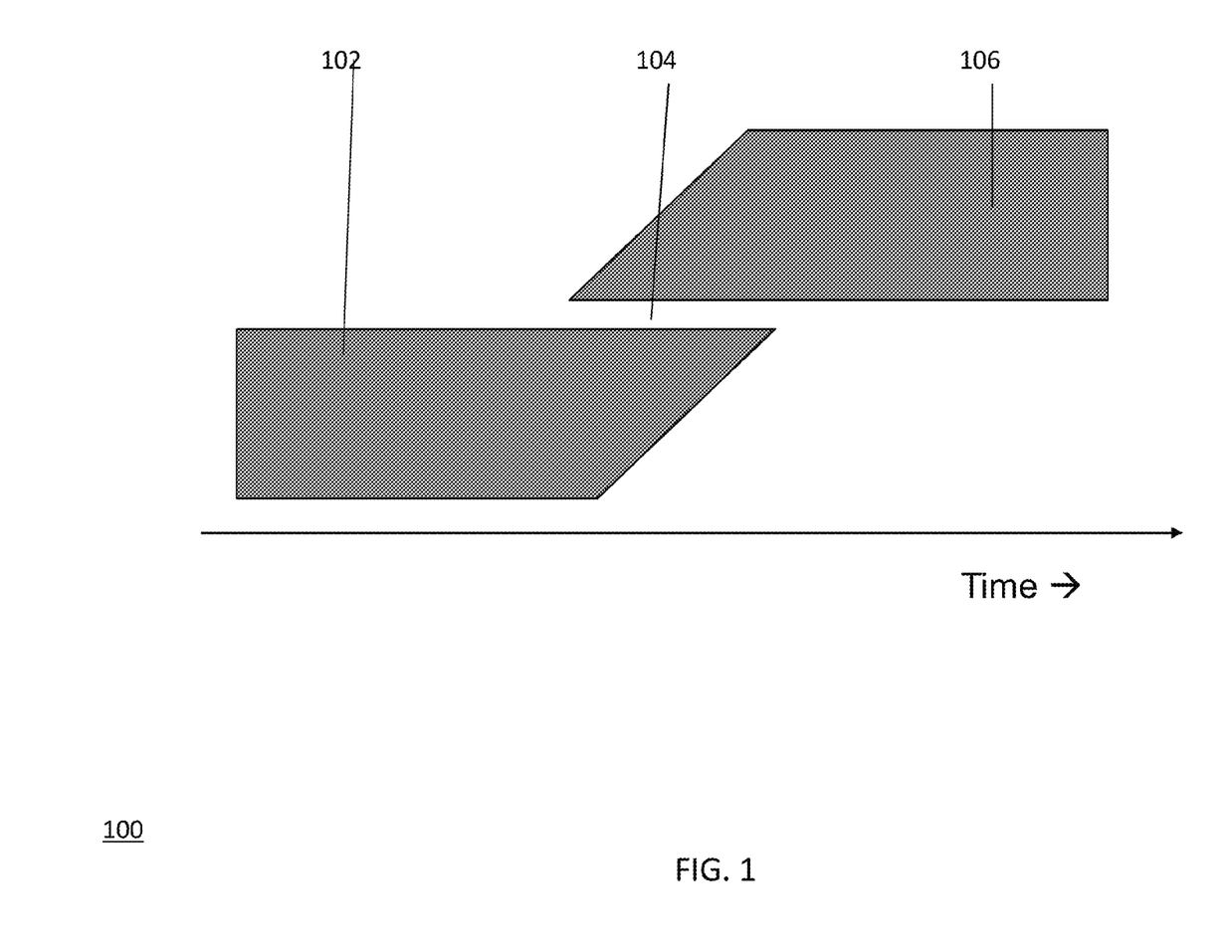
FIG. 1 is a diagram illustrating a timeline for a continuous provision of access to an application and associated data during an upgrade of the application and during a testing of the upgrade.

FIG. 1 is a diagram 100 illustrating a timeline for a continuous provision of access to an application and associated data during an upgrade of the application and during a testing of the upgrade.

At 102, access to a first version of the application is enabled. The access can be provided to a user of the application via a computer or computer network. At 104, access to an upgraded/second version of the application is enabled and asynchronously provided to the user upon individual log-out. The user is not logged out synchronously and/or automatically with a log out of other users. Instead, the user is allowed to log-off when the user desires, and the upgrade occurs when each user re-logs-on individually and independent of other users. During the upgrade, the users are provided a continuous selective access to the application. At 106, access to the upgraded/second version of the application is enabled and provided to the user.

In some alternate implementations, the user may not be required to re-logon to access the upgraded application, but the upgrade may need to be reloaded into the database.

Continuous or uninterrupted access to the functionality of the application is important in various industries, such as financial services, accounting, customer services, service providers, and/or other industries.

The term "user," as noted herein, can mean one or more of: customers, clients, entities, business units (for example, corporations, partnerships, and other units), groups of people, individuals, and the like.

Figure 2:
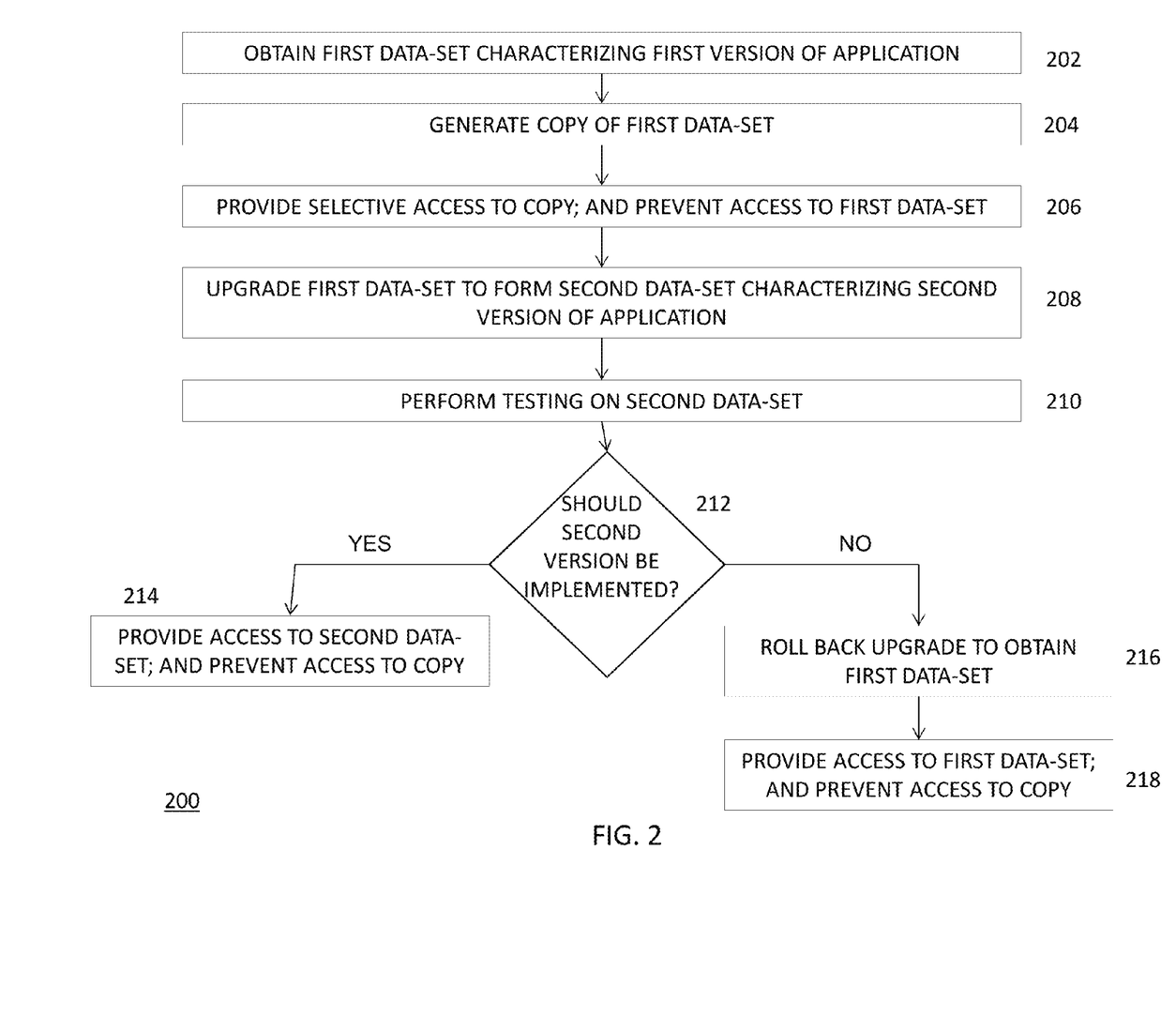
FIG. 2 is a flow diagram illustrating a method of providing a continuous access to an application during an upgrade of the application and during a testing of the upgrade.

FIG. 2 is a flow diagram illustrating a method 200 of providing a continuous access to an application during an upgrade of the application and during a testing of the upgrade. A first version of the application is upgraded to a second version of the application.

At 202, a first data-set characterizing a first version of the application is obtained from an original system. In some implementations, the original system includes a central server computer that includes a database. The first data-set can be obtained from the original system via a computing network. The first data-set can be obtained by a computing system by a data transfer from a memory associated with the original system, or by other electronic means. Initially, access to the first data-set is enabled and provided to a user. In some implementations, the enabling and providing can be a single functional operation. In other implementations, the enabling and the providing can include two or more functional operations.

At 204, a copy of the first data-set is generated on a temporary system, such as a temporary server computer. In some implementations, the copy is generated when the upgrade of the application becomes available for implementation subsequent to preparation of the upgrade by an application developer. The temporary server can be reused every time a new upgrade becomes available for implementation.

At 206, access to the copy in the temporary system is enabled and provided to the user for a time-period after the upgrade becomes available. In some implementations, the enabling and providing can be a single functional operation. In other implementations, the enabling and the providing can include two or more functional operations. This access can be selective or restrictive. The selective or restrictive access characterizes a read-only access for a portion of the first data-set that can be changed during the upgrade, and a read and write access for another portion of the first data-set that may not be changed during the upgrade. Also, at 206, access to the first-data set on the original system is prevented during the time-period. Access to the copy of the first data-set, while the original version of the first data-set is inaccessible, occurs separately/individually for each user of the application after the user separately/individually logs-out of a current session. Such a separate/individual access can be convenient for the user as the user can continue to work and is not forcibly logged out when an upgrade of the application is available.

At 208, the first data-set on the original system can be upgraded during a first portion of the time-period. The upgrading forms a second data-set characterizing a second version of the application. At 210, testing can be performed during a second portion of the time-period. The testing determines whether the second data-set should be implemented.

At 212, towards an end of the second portion of the time-period, it can be determined whether the second data-set should be implemented. This determining includes a computer-implemented check by the system to ensure that there are no significant bugs or other problems associated with the second version. Thus, testing of the second data-set can be performed by the system to determine a feasibility of implementing the upgraded data, while continuously and selectively enabling access to the copy of the application on the temporary system.

At 214, access to the second data-set on the original system is enabled and provided to the user if it is determined, at 212, that the second version should be implemented. In some implementations, the enabling and providing can be a single functional operation. In other implementations, the enabling and the providing can include two or more functional operations. Such an access to the second data-set on the original system is enabled after an end of the time-period. Also, at 214, access to the copy on the temporary system is prevented. Access to the second data-set and prevention of access to the copy occur asynchronously (for example, separately and individually) for each user, after each user separately/individually logs-out of a current session.

At 216, changes performed by the upgrading are rolled-back so as to form/re-obtain the first data-set if it is determined, at 212, that the second version should not be implemented.

At 218, access to the first data-set that is obtained at 216 and that is implemented on the original system can be enabled and provided to the user after the time-period. Further, access to the copy on the temporary system is prevented at 218. Complete access to the first data-set and the prevention of selective access to the copy occur asynchronously (for example, separately and individually) for each user after each user separately/individually logs-out of a current session.

Figure 3:
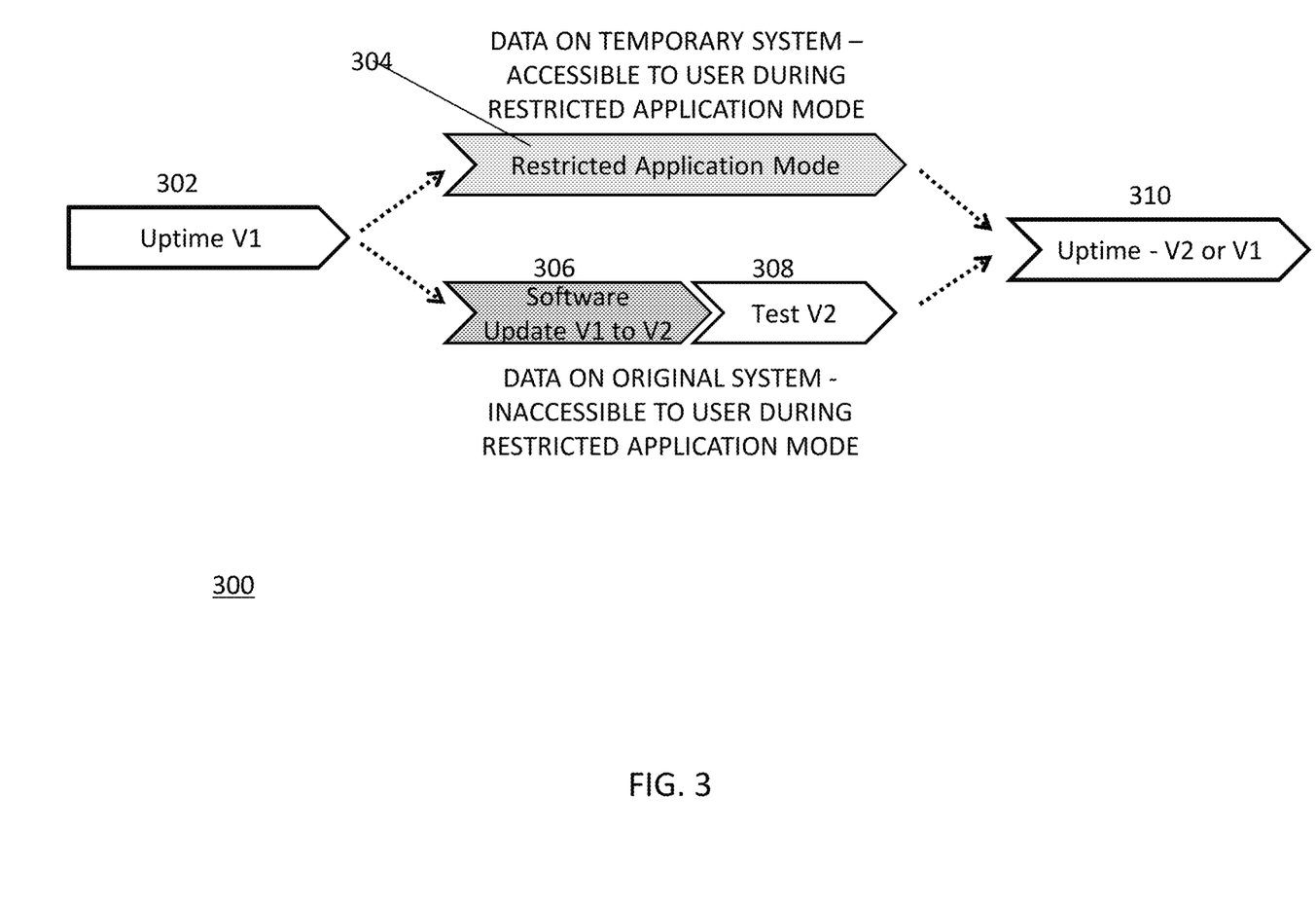
FIG. 3 is a diagram illustrating a method of enabling and providing a continuous access to an application during an upgrade of the application and during a testing of the upgrade.

FIG. 3 is a flow diagram illustrating a method 300 of enabling and providing a continuous access of an application during an upgrade of the application, and during a testing of the upgrade. The upgrade is from a first version V1 of the application to a second version V2 of the application.

At 302, access to a first data-set characterizing a first version V1 of the application is enabled and provided to a user of the application. That is, the first version V1 has an uptime. This first data-set is implemented on an original system, such as an original server.

When an upgrade for the application becomes available for implementation, a copy of the first data-set is generated on a temporary system, such as a temporary server. At 304, for a time-period after a time when the upgrade is available, a selective/restricted access to the copy on the temporary system is enabled and provided to the user. The selective access characterizes a read-only access for a portion (of the first data-set) that can be changed during the upgrade, and a read and write access for another portion (of the first data-set) that may not be changed during the upgrade. Also, during the time-period, access to the first-data set on the original system is prevented.

At 306, the first data-set on the original system is upgraded to form a second data-set characterizing a second version V2 of the application. The upgrade occurs during a first portion of the time-period. At 308, during a second portion of the time-period, testing is performed by the system on the second-data.

At 310, if a result of the testing at 308 indicates that the second version should be implemented, access to the second data-set on the original system is enabled and provided to the user, there being an uptime of the second version V2. Also, access to the copy on the temporary system is prevented. If a result of the testing at 308 indicates that the second version should not be implemented, changes performed by the upgrading can be rolled-back so as to form/re-obtain the first data-set. Further, at 310, access is to the first data-set is enabled and provided to the user, there being an uptime of the first version V1. Further, access to the copy on the temporary system is prevented.

Figure 4:
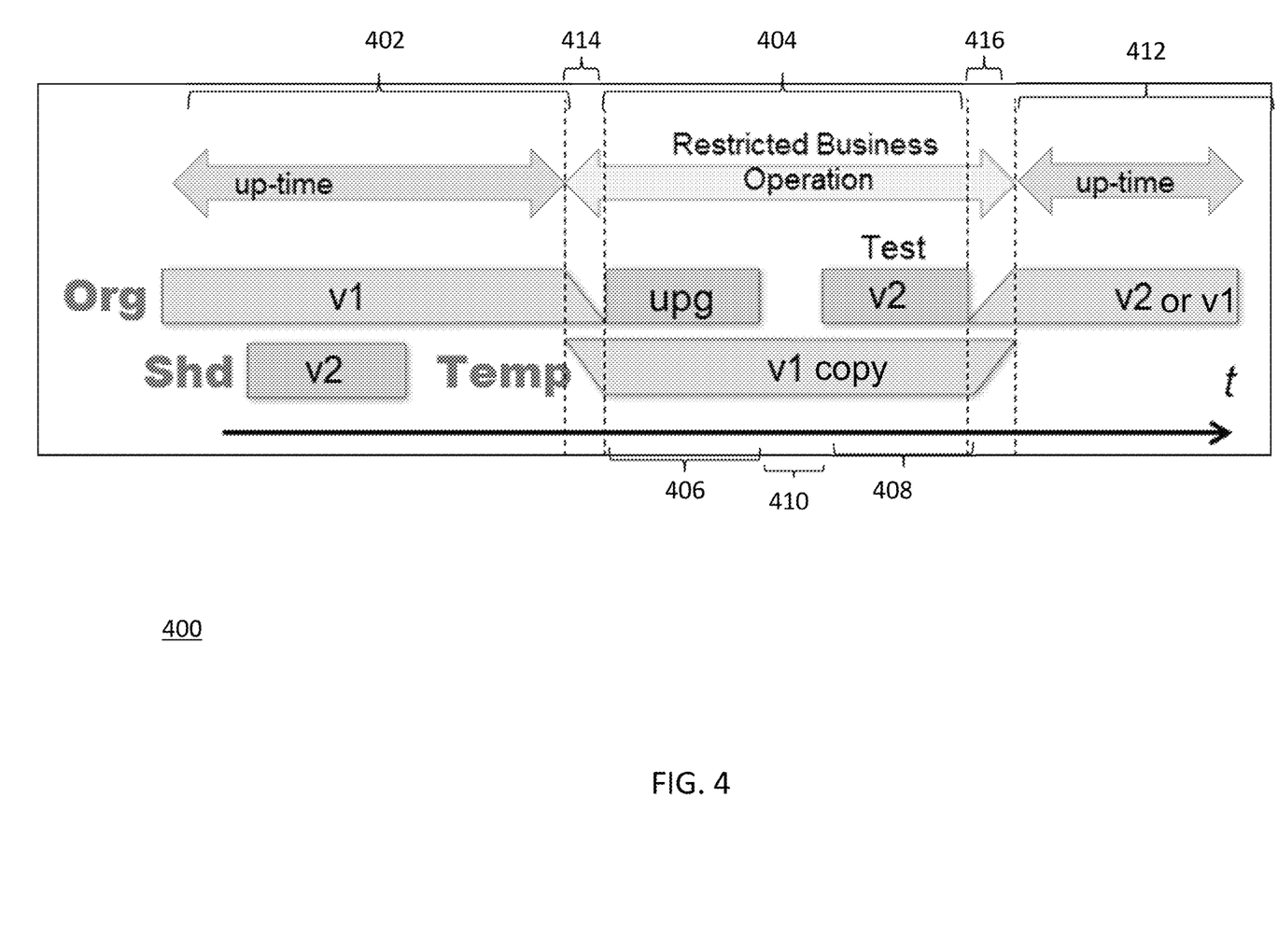
FIG. 4 is a diagram illustrating a timeline for a continuous provision of access to an application to the users during an upgrade of the application and during a testing of the upgrade.

FIG. 4 is a diagram 400 illustrating a timeline for a continuous provision of access to an application during an upgrade of the application and during a testing of the upgrade.

Initially, in a first time-period 402, access to a first data-set characterizing a first version V1 of the application is enabled and provided to a user of the application. That is, the first version V1 on the original system has an uptime during the first time-period 402. At the end of time-period 402, an upgrade for the application becomes available. Subsequently, a copy of the first data-set is generated on a temporary system, such as a temporary server.

For a second time-period 404, a selective/restricted access to the copy on the temporary system is enabled and provided to the user. The selective access characterizes a read-only access for a portion of the first data-set that can be changed during the upgrade, and a read and write access for another portion of the first data-set that is not changed during the upgrade. Also, during the second time-period 404, user-access of the first-data set on the original system is prevented.

On the original system, the upgrade and the testing of the second data-set is performed. During a first portion 406 of the second time-period 404, the first data-set on the original system is upgraded to form a second data-set characterizing a second version V2 of the application. The upgrading includes an import of a customer code, and a customizing of the application based on the imported customer code. During a second portion 408 of the second time-period 404, computer-implemented testing is performed by the system on the second data-set. In the time-period 410 between the first portion 406 and the second portion, individual customer demand can be manually integrated into the application so as to align the second version V2 of the application with the customer demand.

If a result of the testing during the second time-period 408 indicates that the second version should be implemented, access to the second data-set on the original system is enabled and provided to the user during a third time-period 412. That is, the second version V2 has an uptime during the third time-period 412. Also, access to the copy on the temporary system is prevented.

If a result of the testing during the second time-period 408 indicates that the second version should not be implemented, changes performed by the upgrading are rolled-back so as to form/re-obtain the first data-set. Access to the first data-set is enabled and provided to the user during the third-time period 412. That is, the first version V1 has an uptime during the third-time period 412. Further, access to the copy on the temporary system is prevented.

The transition time-periods 414 and 416 facilitate transitioning of operations between time-periods on both sides (that is, left side and right side in the diagram 400) of each transition time-period.

Figure 5:
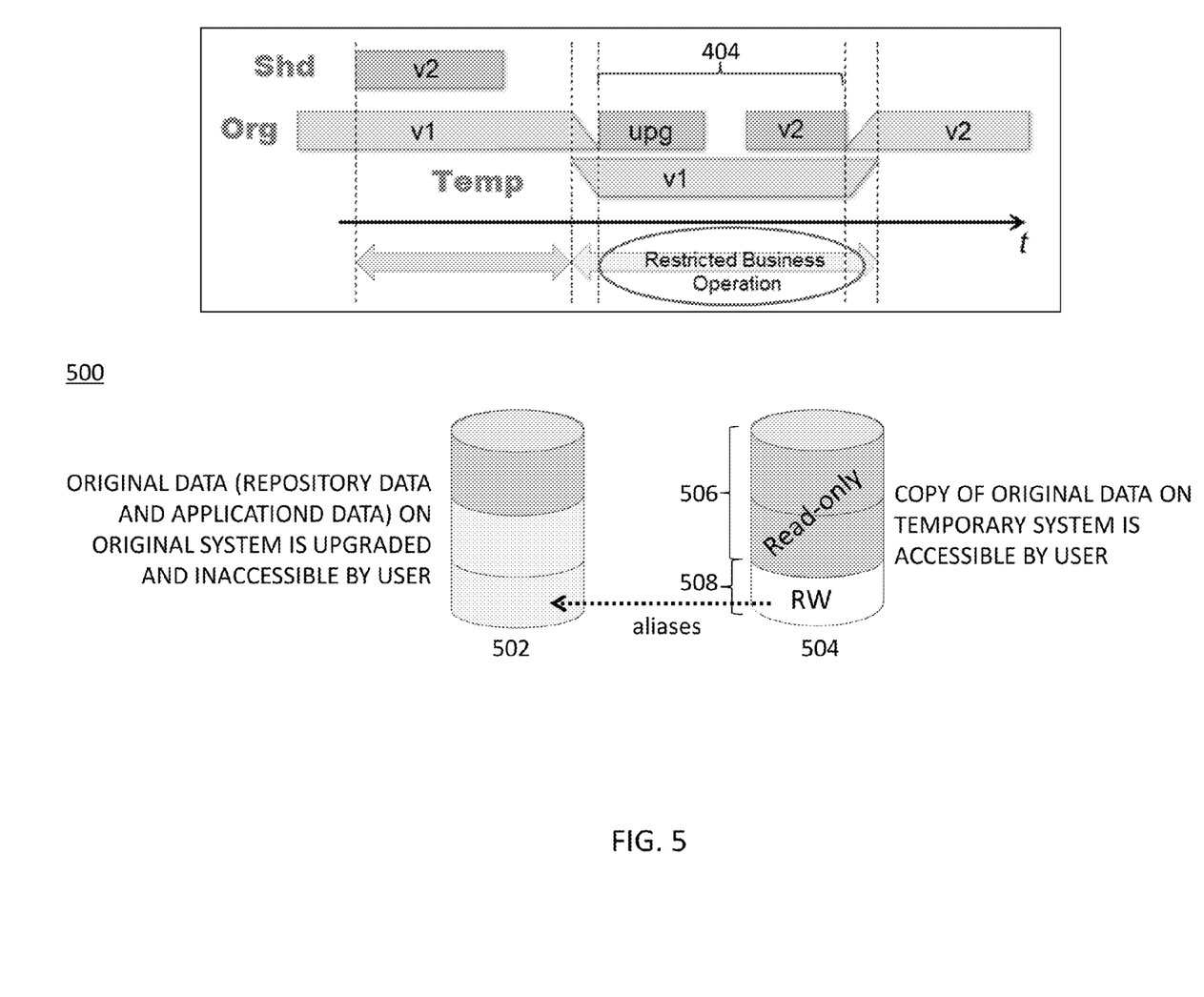
FIG. 5 is a diagram illustrating operations performed during a time-period when users have selective/restricted access to a first data-set characterizing a first version of the application that is being upgraded.

FIG. 5 is a diagram illustrating operations 500 performed during a time-period 404 when users have selective/restricted access to a first data-set characterizing a first version V1 of the application that is being upgraded. Each of the original system database 502 and the temporary system database 504 includes repository data and application data.

The first data-set in the original system database 502 is upgraded to the second data-set that characterizes a second version V2 of the application. The first data-set is inaccessible for the user of the application when the upgrade is being made.

The temporary system database 504 includes a copy of the first data-set, selectively access to which is enabled and provided to the user. The selective accessibility occurs because only a read access to the data 506 that is changed by the upgrade is enabled and provided to the user, but a write access to the data that is changed is not enabled. For the data 508 that is not changed by the upgrade, a user is allowed a read and write access. If the user modifies the data 508, the corresponding changes (for example, aliases) are made to the corresponding data in the original system database 502.

The original system database 502 and the temporary database 504 are a structured/organized set of data, such as one or more tables. Each of the original system database 502 and the temporary database 504 can be at least one of the following: a hierarchical database, a network database, a relational database, an object oriented database, and/or any other database. The hierarchical database can be organized in a hierarchical pyramid fashion, like the branches of a family tree extending downwards, wherein related fields or records are grouped together so that there are higher-level records and lower-level records. The network database can look like a cobweb or an interconnected network of records, wherein each child record can have more than one parent record. The relational databases can connect data in different tables by using common data elements or a key field in the tables.

Figure 6:
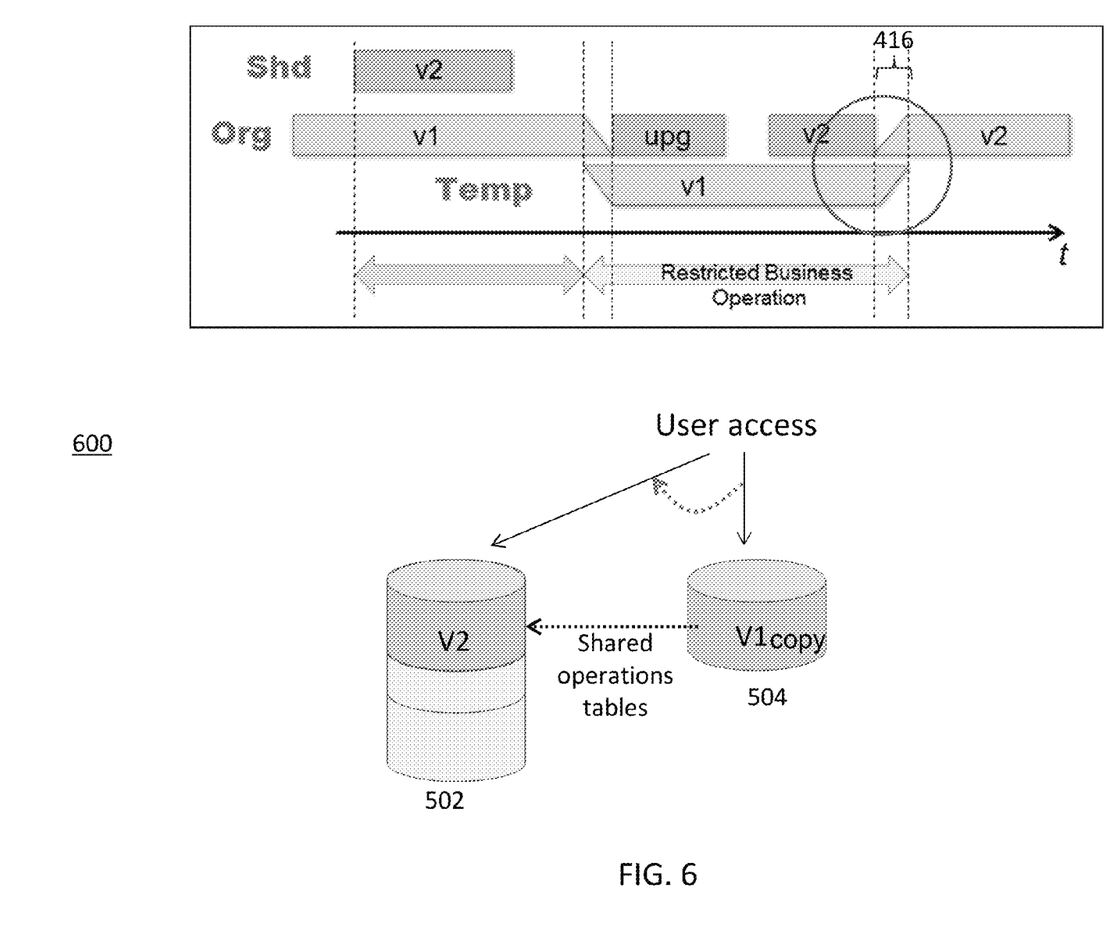
FIG. 6 is a diagram illustrating operations performed during a transition time-period after a testing of a second test-data characterizing a second version of the application.

FIG. 6 is a diagram illustrating operations 600 performed during a transition time-period 416 after a testing of a second test-data characterizing a second version V2 of the application. During the transition time-period 416, the users of the application are switched, on a user-by-user basis (that is, separately/individually), from accessing the copy of first data-set in the temporary system database 504 to accessing the second data-set in the original system database 502.

The database is implemented at a server. Clients of the server can have one or more users, which can access the database. The users can query the database by inputting commands of a query programming language (for example, structured query language—SQL) on a graphical user interface implemented at the respective clients. The results of the query can also be displayed on the graphical user interface in at least one of: graphical format, numerical format, alphabetic format, alphanumeric format, or any other format. The clients and the server can be connected by a client-server architecture. The clients are connected to the server via a communication network, such as the internet. Although internet has been described, other communication networks are also possible, such as an intranet, a local area network, a wide area network, a metropolitan area network, a Bluetooth network, an infrared network, a zigbee network, a telecommunication network, and other networks.

Figure 7:
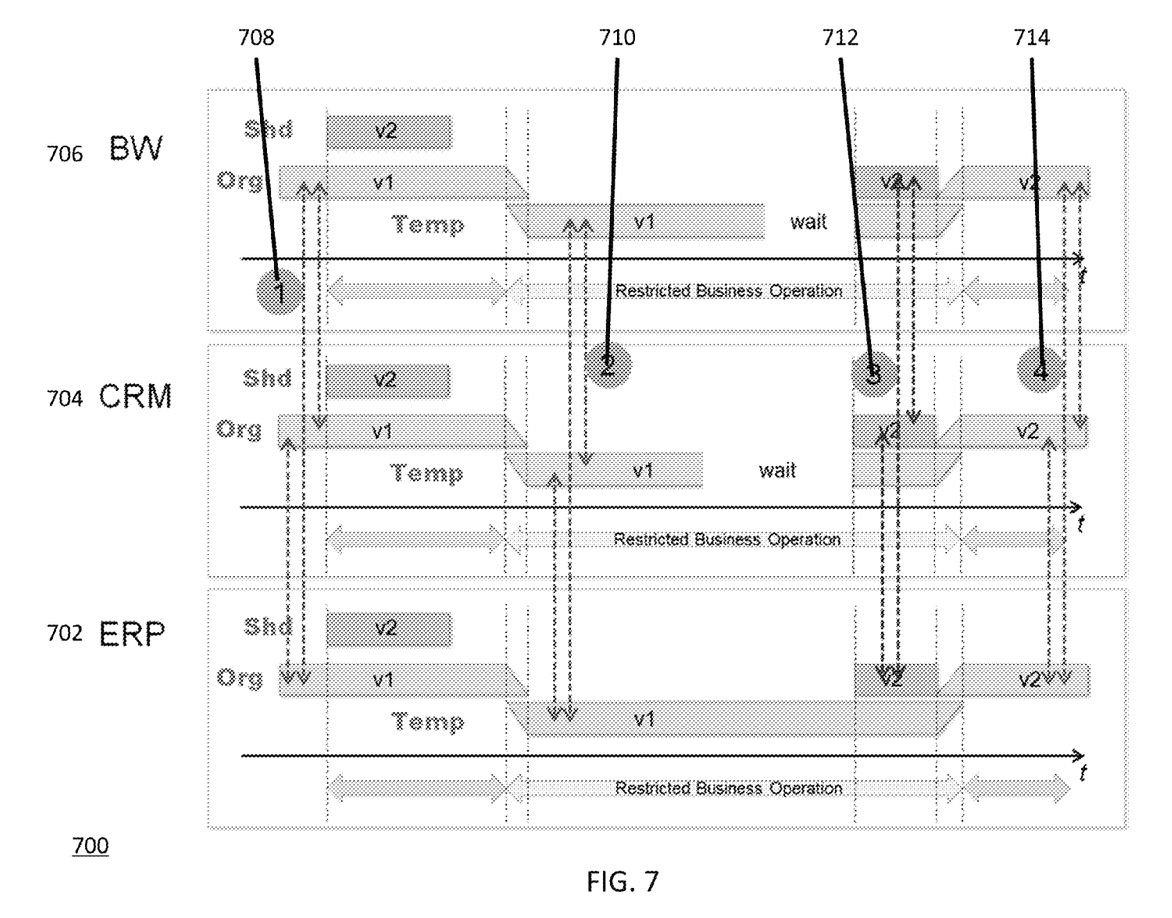
FIG. 7 is a diagram illustrating a continuous provision of an application to the users during an upgrade of the application and during a testing of the upgrade, and a subsequent implementing of the upgrade.

FIG. 7 is a diagram 700 illustrating a continuous provision of an application to the users during an upgrade of the application and during a testing of the upgrade, and a subsequent implementing of the upgrade.

The application is a distributed application that is executed over a distributed computing landscape including one or more of: an enterprise resource planning system 702, a customer relationship management system 704, a data warehouse system 706, and other systems. The enterprise resource planning system 702 is a distributed computing system that can integrate internal and external data across different offices and/or departments (for example, finance, accounting, marketing, sales, and other departments) of an entire business entity. The customer relationship management system 704 manages interactions of a business entity with customers and prospective customers. The data warehouse system 706 is a database that can be created by integrating data from multiple disparate sources. When the application is upgraded from a first version V1 to a second version V2, the computing landscape is also upgraded from a first version of the landscape to a second version of the landscape.

The enterprise resource planning system 702, the customer relationship management system 704, and the data warehouse system 706 communicate with each other at 708. An original system includes a first data-set characterizing a first version of the application distributed over the computing landscape. When an upgrade of the application becomes available, a temporary system is set up. The temporary system contains a copy of the first data-set. The temporary system allows the enterprise resource planning system 702, the customer relationship management system 704, and the data warehouse system 706 to continue to communicate via communication channels that are the same as those allowed by the original system.

The enterprise resource planning system 702, the customer relationship management system 704, and the data warehouse system 706 are triggered, at 710, to move, in a synchronized manner and on a user-by-user basis, to a restricted business operations mode. In the restricted business operations mode, selective access to the copy of the first-data set on the temporary system is enabled while access to the first data-set on the original system may not be enabled.

Once any of the enterprise resource planning system 702, the customer relationship management system 704, and the data warehouse system 706 reaches 712, where testing of second data-set is to be performed, the system waits for other systems to reach 712. During the testing at 712, the enterprise resource planning system 702, the customer relationship management system 704, and the data warehouse system 706 continue to communicate via communication channels that are same as those allowed by the original system. It is determined, at 712, whether the second data-set, which can characterize both the second version of the application and the second version of the computing landscape, can be implemented. This determining includes a computer-implemented check by the system ensure that there are no significant bugs or other problems associated with the second version.

If it is determined at 712 that the second data-set should be implemented, the second data-set characterizing the second version V2 is implemented at 714. Thus, enterprise resource planning system 702, the customer relationship management system 704, and the data warehouse system 706 are connected in parallel, and upgraded simultaneously.

Figure 8:
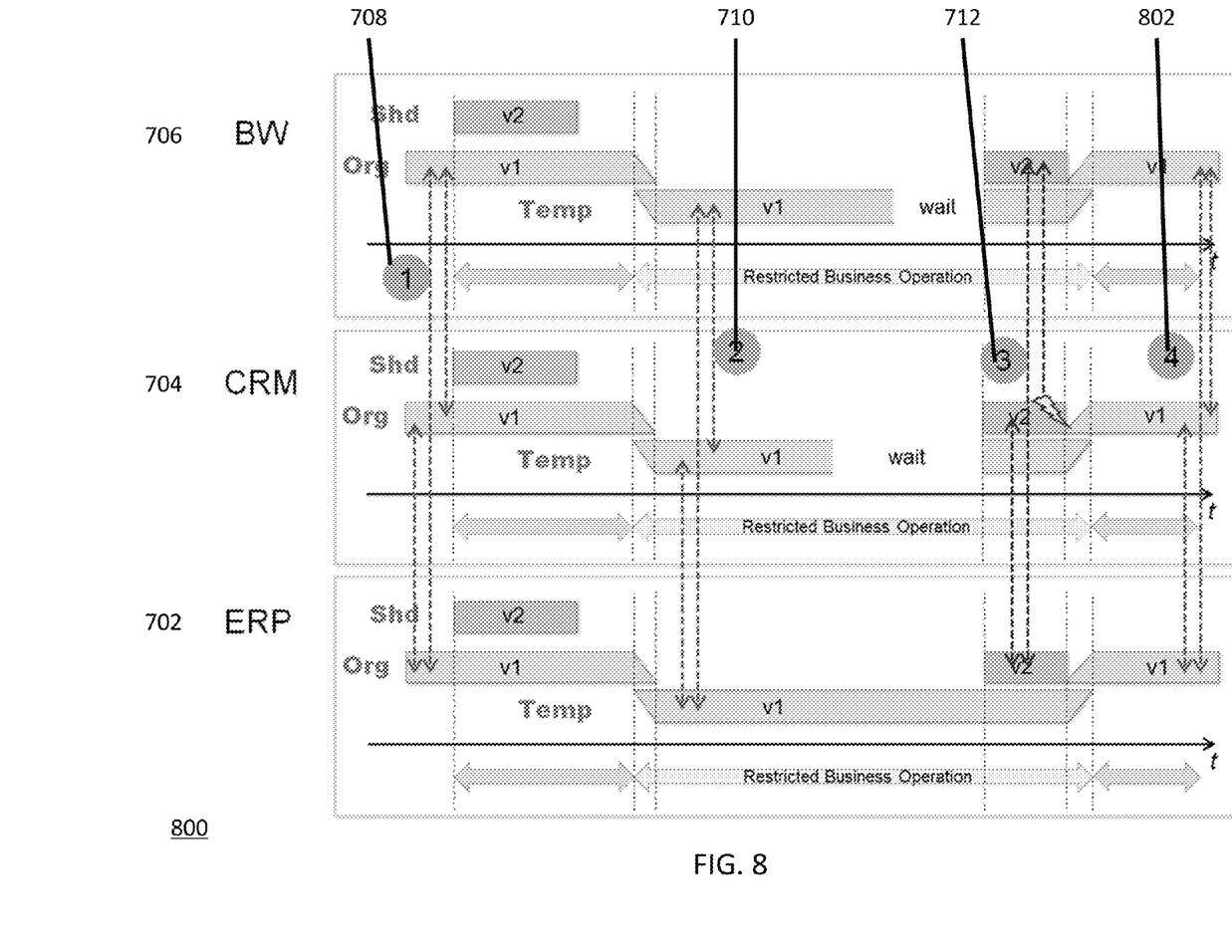
FIG. 8 is a diagram illustrating a continuous provision of an application to the users during an upgrade of the application and during a testing of the upgrade, and a subsequent rolling-back of changes performed during the upgrade.

FIG. 8 is a diagram 800 illustrating a continuous provision of an application to the users during an upgrade of the application and during a testing of the upgrade, and a subsequent rolling-back of changes performed during the upgrade.

The operations at 708, 710, and 712 are performed, as noted above. However, if it is determined at 712 that the second data-set should not be implemented, the changes in the upgrade can be rolled-back (shown with the electric spark symbol) so as to re-obtain the first data-set. The first data-set characterizing the first version V1 is then implemented at 802.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:
1. A computer-implemented method comprising:
generating, using one or more processors, a copy of a first data-set on a temporary system, the first data-set characterizing a first version of an application;

enabling, using one or more processors, a selective access to the copy to a user of the application during a time period;

upgrading, using one or more processors, the first data-set to form a second data-set characterizing a second version of the application, the upgrading occurring during a first portion of the time-period, the selective access to the copy during the time period being a read-only access for a portion of the first data-set that is changed during the upgrading and a read and write access for another portion of the first data-set that is unchanged during the upgrading;

testing, using one or more processors, the second data-set during a second portion of the time-period; and enabling, using one or more processors, access to the second data-set to the user of the application when a result of the testing indicates that the second data-set should be implemented, wherein the temporary system is reused every time a new upgrade becomes available.

2. The method of claim 1, wherein:
the first data-set and the second data-set are executed on an original system; and
the copy is executed on the temporary system.

3. The method of claim 1, further comprising:
preventing, using one or more processors, an access to the first data-set during the time-period.

4. The method of claim 1, further comprising:
preventing, using one or more processors, access to the copy when a result of the testing indicates that the second data-set should be implemented.

5. The method of claim 4, wherein:
the enabling of the access to the second data-set occurs after a completion of the time-period; and
the preventing of the access to the copy occurs after the completion of the time-period.

6. The method of claim 1, further comprising:
rolling-back, using one or more processors, changes performed by the upgrading to form the first data-set, the rolling back being performed when a result of the testing indicates that the second data-set should not be implemented; and
enabling, using one or more processors, access to the first data-set formed by the rolling-back of the changes, the access being enabled for the user of the application.

7. The method of claim 6, further comprising:
preventing, using one or more processors, access to the copy when access is enabled for the user of the application to the first data-set formed by the rolling-back of the changes.

8. The method of claim 1, wherein the application is executed in a computing landscape comprising an enterprise resource planning system, a customer relationship management system, and a business warehouse system.

9. The method of claim 8, wherein:
the first data-set comprises data associated with a first version of the computing landscape; and
the second data-set comprises data associated with a second version of the computing landscape.

10. The method of claim 9, wherein the temporary system allows a communication between the enterprise resource planning system, the customer relationship management system, and the business warehouse system via one or more communication channels that are same as communication channels used for communication allowed by an original system.

11. A non-transitory computer program product storing instructions that, when executed by at least one programmable processor, cause the at least one programmable processor to perform operations comprising:

generating a copy of a first data-set characterizing a first version of an application, the copy being generated on a temporary system;

enabling a restrictive access to a user of the application to the copy during a time-period;

upgrading the first data-set to form a second data-set characterizing a second version of the application, the upgrading occurring during a first portion of the time-period, the restrictive access to the copy during the time period being a read-only access for a portion of the first data-set that is changed during the upgrading and a read and write access for another portion of the first data-set that is unchanged during the upgrading;

performing a testing of the second data-set during a second portion of the time-period;

rolling-back changes performed by the upgrading to form the first data-set, the rolling-back being performed when a result of the testing indicates the second data-set should not be implemented; and enabling, for the user of the application, access to the first data-set formed by the rolling-back of the changes, wherein the temporary system is reused when a new upgrade becomes available.

12. The computer program product of claim 11, wherein the operations further comprise:
preventing access to the copy when a result of the testing indicates that the second data-set should not be implemented.

13. The computer program product of claim 12, wherein:
the enabling of the access to the first data-set obtained after the rolling-back occurs after a completion of the time-period; and
the preventing of the access to the copy occurs after the completion of the time-period.

14. The computer program product of claim 11, wherein the operations further comprise:
enabling, when a result of the testing indicates that the second data-set should be implemented and for the user of the application, an access to the second data-set.

15. The computer program product of claim 14, wherein the operations further comprise:
preventing access to the copy when access to the second data-set is enabled.

16. The computer program product of claim 11, wherein the application is executed in a computing landscape comprising an enterprise resource planning system, a customer relationship management system, and a business warehouse system.

17. A system comprising:
at least one programmable processor; and
a non-transitory machine-readable medium storing instructions that, when executed by the at least one processor, cause the at least one programmable processor to perform operations comprising:
generating a copy of a first data-set characterizing a first version of an application, the copy being generated on a temporary system configured to be reused every time a new upgrade becomes available;
enabling a selective access to the copy during a time-period;
upgrading the first data-set to form a second data-set characterizing a second version of the application, the upgrading being performed during a first portion of the time-period, the selective access to the copy during the time period being a read-only access for a portion of the first data-set that is changed during the upgrading and a read and write access for another portion of the first data-set that is unchanged during the upgrading;

performing a testing of the second data-set during a second portion of the time-period;

enabling an access to the second data-set when a result of the testing indicates that the second data-set should be implemented; and rolling-back changes performed by the upgrading to form the first data-set, the rolling-back being performed when a result of the testing indicates the second data-set includes one or more critical errors; and enabling access to the first data-set formed by the rolling-back of the changes.

18. The system of claim 17, wherein the operations further comprise:

preventing access to the copy when a result of the testing is obtained.

19. The system of claim 17, wherein:

the application is executed in a computing landscape comprising an enterprise resource planning system, a customer relationship management system, and a business warehouse system;

the first data-set comprises data associated with a first version of the computing landscape; and the second data-set comprises data associated with a second version of the computing landscape.

* * * * *